United States Patent
Hermes

(10) Patent No.: US 9,354,734 B2
(45) Date of Patent: May 31, 2016

(54) COMMON-MODE HOVER DETECTION

(71) Applicant: Bernard J. Hermes, Southampton (GB)

(72) Inventor: Bernard J. Hermes, Southampton (GB)

(73) Assignee: Atmel Corporation, San Jose, CA (US)

( * ) Notice: Subject to any disclaimer, the term of this patent is extended or adjusted under 35 U.S.C. 154(b) by 68 days.

(21) Appl. No.: 14/196,958

(22) Filed: Mar. 4, 2014

(65) Prior Publication Data

US 2015/0253881 A1    Sep. 10, 2015

(51) Int. Cl.
*G06F 3/041* (2006.01)

(52) U.S. Cl.
CPC ...... *G06F 3/041* (2013.01); *G06F 2203/04108* (2013.01)

(58) Field of Classification Search
CPC ....... G06F 3/041; G06F 3/044; G06F 3/0416; G06F 2203/04107; G06F 2203/04108; G06F 2203/04101
USPC ...................... 345/173, 174; 178/18.01, 18.06
See application file for complete search history.

(56) References Cited

U.S. PATENT DOCUMENTS

| | | | |
|---|---|---|---|
| 4,290,052 A | | 9/1981 | Eichelberger et al. |
| 5,805,251 A | * | 9/1998 | Ozawa .............. G02F 1/133308 174/36 |
| 6,188,391 B1 | | 2/2001 | Seely et al. |
| 6,239,788 B1 | * | 5/2001 | Nohno et al. ................. 345/173 |
| 7,463,238 B2 | | 12/2008 | Funkhouser et al. |
| 7,663,607 B2 | | 2/2010 | Hotelling |
| 7,864,503 B2 | | 1/2011 | Chang |
| 7,875,814 B2 | | 1/2011 | Chen |
| 7,920,129 B2 | | 4/2011 | Hotelling |
| 8,031,094 B2 | | 10/2011 | Hotelling |
| 8,031,174 B2 | | 10/2011 | Hamblin |
| 8,040,326 B2 | | 10/2011 | Hotelling |
| 8,049,732 B2 | | 11/2011 | Hotelling |
| 8,089,470 B1 | | 1/2012 | Schediwy et al. |
| 8,179,381 B2 | | 5/2012 | Frey |
| 8,217,902 B2 | | 7/2012 | Chang |
| 8,283,567 B2 | | 10/2012 | Yoo et al. |
| 8,723,824 B2 | | 5/2014 | Myers et al. |
| 2006/0050059 A1 | | 3/2006 | Satoh |
| 2008/0088594 A1 | | 4/2008 | Liu et al. |
| 2008/0088595 A1 | | 4/2008 | Liu et al. |
| 2008/0179112 A1 | | 7/2008 | Qin et al. |
| 2008/0309635 A1 | | 12/2008 | Matsuo |
| 2009/0039740 A1 | | 2/2009 | Sortore et al. |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.

(Continued)

*Primary Examiner* — Koosha Sharifi-Tafreshi
(74) *Attorney, Agent, or Firm* — Baker Botts L.L.P.

(57) ABSTRACT

In one embodiment, a method includes substantially simultaneously applying a pre-determined voltage to a conductive layer and to one or more electrodes of a touch sensor. The conductive layer is spatially separated from the electrodes by at least a thickness of a substrate. The method also includes determining a difference between a measurement current of one or more of the electrodes and a reference value; and determining whether a proximity or touch input to the touch sensor has occurred based at least in part on the difference.

17 Claims, 9 Drawing Sheets

(56) References Cited

U.S. PATENT DOCUMENTS

| | | | |
|---|---|---|---|
| 2009/0066669 A1 | 3/2009 | Olson | |
| 2009/0160529 A1 | 6/2009 | Lamborghini et al. | |
| 2009/0315854 A1 | 12/2009 | Matsuo | |
| 2010/0079401 A1 | 4/2010 | Staton | |
| 2010/0079402 A1 | 4/2010 | Grunthaner et al. | |
| 2010/0096193 A1 | 4/2010 | Yilmaz | |
| 2011/0080357 A1 | 4/2011 | Park et al. | |
| 2011/0080358 A1 | 4/2011 | Park et al. | |
| 2011/0147192 A1* | 6/2011 | Hsu | 200/600 |
| 2011/0157078 A1* | 6/2011 | Miyazawa et al. | 345/174 |
| 2011/0169783 A1 | 7/2011 | Wang et al. | |
| 2011/0261007 A1* | 10/2011 | Joharapurkar et al. | 345/174 |
| 2011/0298745 A1* | 12/2011 | Souchkov | 345/174 |
| 2012/0019165 A1 | 1/2012 | Igaki et al. | |
| 2012/0032917 A1 | 2/2012 | Yamaguchi | |
| 2012/0050193 A1 | 3/2012 | Noguchi et al. | |
| 2012/0057312 A1 | 3/2012 | Yoo et al. | |
| 2012/0229417 A1* | 9/2012 | Badaye | 345/174 |
| 2012/0229882 A1 | 9/2012 | Fish, Jr. et al. | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin et al. | |
| 2013/0076612 A1 | 3/2013 | Myers | |
| 2013/0314365 A1 | 11/2013 | Woolley et al. | |
| 2013/0335370 A1* | 12/2013 | Heo et al. | 345/174 |
| 2014/0104233 A1 | 4/2014 | Wang et al. | |
| 2014/0111443 A1 | 4/2014 | Guo et al. | |
| 2014/0176819 A1 | 6/2014 | Yilmaz | |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

COMMON-MODE HOVER DETECTION

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the touch sensor, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
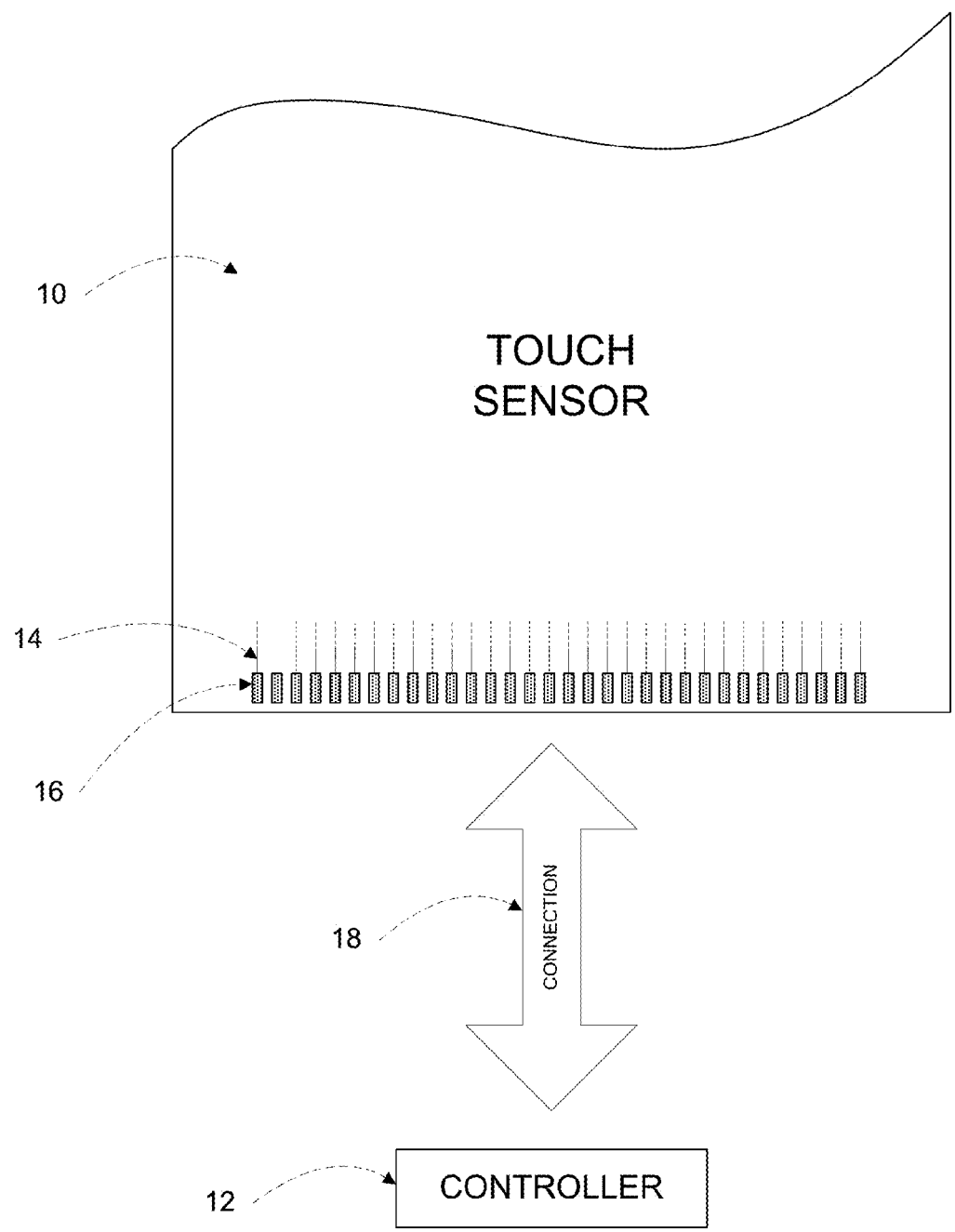
FIG. 1 illustrates an example array of touch sensors with an example touch-sensor controller.

FIG. 1 illustrates an example touch sensor array with an example touch-sensor controller. Touch sensor array 10 and touch-sensor controller 12 may detect the presence and location of a touch or the proximity of an object within a touch-sensitive area of touch sensor array 10. Herein, reference to a touch sensor array may encompass both the touch sensor and its touch-sensor controller, where appropriate. Similarly, reference to a touch-sensor controller may encompass both the touch-sensor controller and its touch sensor array, where appropriate. Touch sensor array 10 may include one or more touch-sensitive areas, where appropriate. Touch sensor array 10 may include an array of electrodes disposed on one or more substrates, which may be made of a dielectric material. Herein, reference to a touch sensor array may encompass both the electrodes of the touch sensor and the substrate(s) that they are disposed on, where appropriate. Alternatively, where appropriate, reference to a touch sensor array may encompass the electrodes of the touch sensor, but not the substrate(s) that they are disposed on.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor array 10 may constitute in whole or in part one or more macro-features of the touch sensor array 10. One or more characteristics of the implementation of those shapes (such as, for example, the conductive materials, fills, or patterns within the shapes) may constitute in whole or in part one or more micro-features of the touch sensor array 10. One or more macro-features of a touch sensor array 10 may determine one or more characteristics of its functionality, and one or more micro-features of the touch sensor array 10 may determine one or more optical features of the touch sensor, such as transmittance, refraction, or reflection.

A mechanical stack may contain the substrate (or multiple substrates) and the conductive material forming the electrodes of touch sensor array 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the electrodes. The mechanical stack may also include a second layer of OCA and a dielectric layer (which may be made of PET or another suitable material, similar to the substrate with the conductive material forming the electrodes). As an alternative, where appropriate, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor array 10 may be made of polyethylene terephthalate (PET) or another suitable material. This disclosure contemplates any suitable substrate with any suitable portions made of any suitable material. In particular embodiments, the electrodes in touch sensor array 10 may be made of ITO in whole or in part. In particular embodiments, the electrodes in touch sensor array 10 may be made of fine lines of metal or other conductive material. As an example and not by way of limitation, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
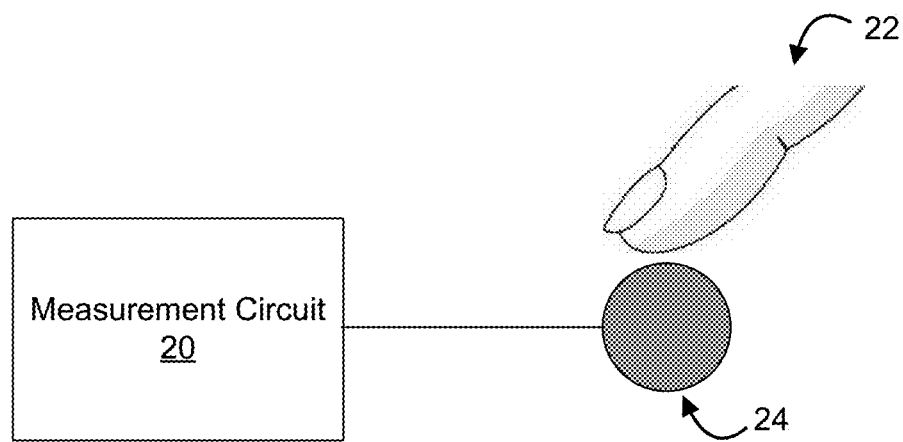
FIGS. 2A-B illustrate an example self-capacitance measurement.
Figure 2B:
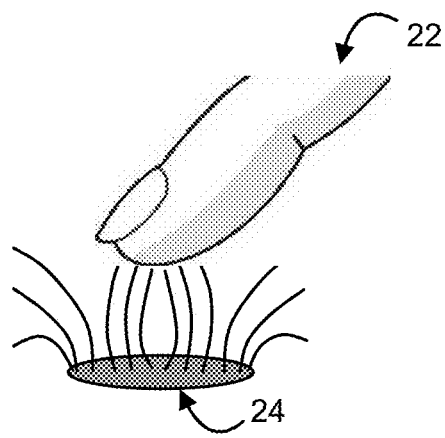

FIGS. 2A-B illustrate an example self-capacitance measurement. In the example of FIG. 2A, an electrode 24 of the touch sensor is coupled to a measurement circuit 20. As described below, electrode 24 forms a capacitance to ground that is distributed in free space. In particular embodiments, the capacitance to ground may include multiple elements, such as for example, capacitance of the tracks in the silicon, tracks on the printed circuit board (PCB), electrodes 24 made from conductive material (ITO, copper mesh, etc.), or an object providing a touch input. Electrode 24 has capacitive coupling to ground through the surrounding objects that are galvanically or capacitively connected to ground. As described above, measurement circuit 20 of the touch-sensor controller transmits a drive signal and senses a signal indicative of a touch or proximity input from an object 22, such as for example a finger, through electrode 24. In particular embodiments, measurement circuit 20 of the touch-sensor controller generates the drive signal transmitted by electrode 24 and senses the capacitance to ground. The capacitance of the surrounding material includes at least in part, the capacitance between electrode 24 and ground with object 22 providing the touch or proximity input. As an example and not by way of limitation, the capacitance provided by object 22 providing the touch or proximity input may add 5-10% of the capacitance sensed by electrode 24.

In the example of FIG. 2B, the drive signal transmitted by electrode 24 generates an electric field that emanates from electrode 24 to a signal ground of the touch sensor. The signal ground is galvanically or capacitively coupled to ground. The presence of an object 22, such as for example finger, affects the electric field and in turn the amount of charge sensed at electrode 24 by measurement circuit 20. As object 22 approaches electrode 24, the capacitance between electrode 24 and ground detected by measurement circuit 20 increases. In particular embodiments, the increase of the capacitance between electrode 24 and ground may be measured by measurement circuit 20 as a decrease of voltage at the capacitance between electrode 24 and ground. In particular embodiments, measurement circuit 20 may be alternately toggled between the drive and sense electrodes of a touch sensor in a mutual capacitance configuration. Although this disclosure describes the measurement circuit being integrated with a touch-sensor controller, this disclosure contemplates a measurement circuit being a discrete circuit or part of any suitable circuit.

Figure 3A:
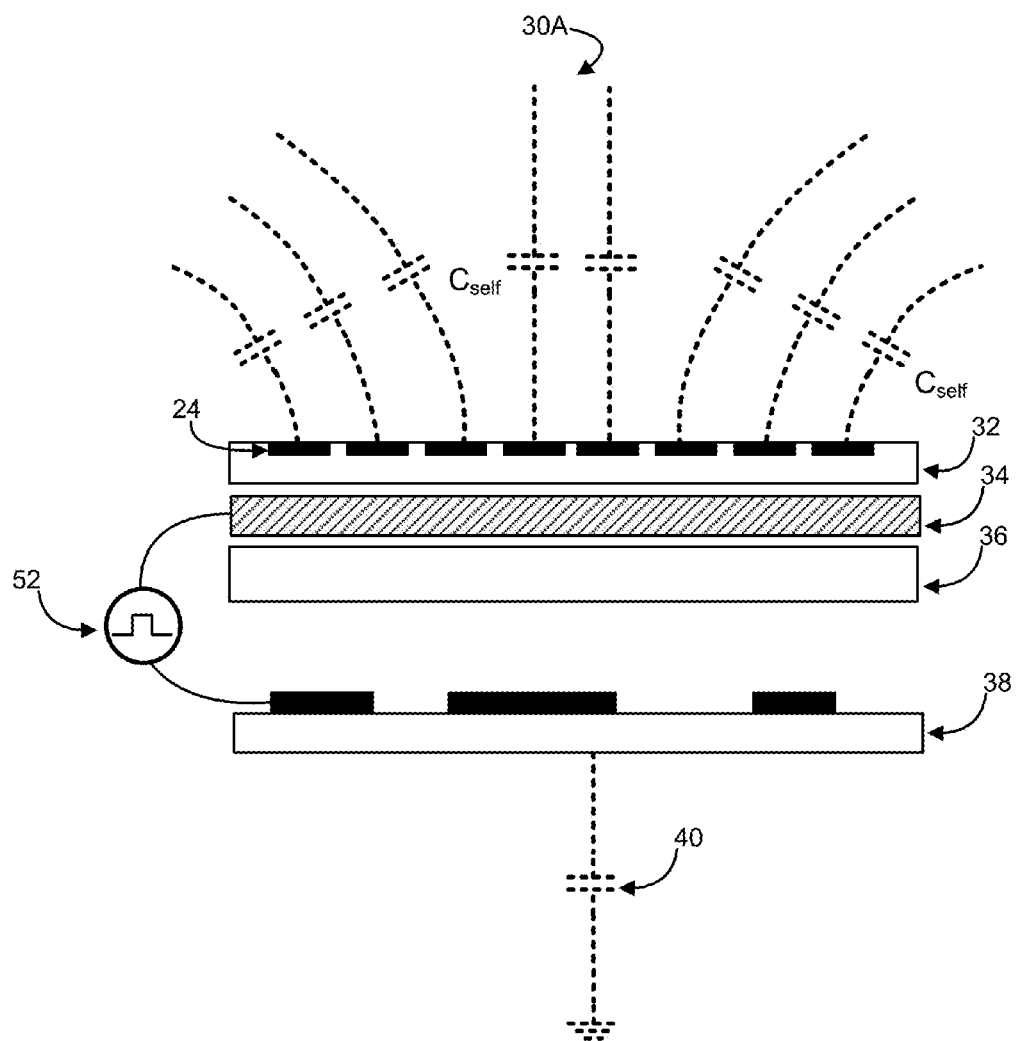
FIG. 3A illustrates an example mechanical stack for driven shield self-capacitance measurements.

FIG. 3A illustrates an example mechanical stack for driven shield self-capacitance measurements. In particular embodiments, mechanical stack 30A may include a substrate 32 with conductive material forming the drive and sense electrodes 24 of the touch sensor, as illustrated in the example of FIG. 1. As an example and not by way of limitation, one or more portions of substrate 32 may be made of PET, glass, polycarbonate, PMMA, FR-4, or another suitable material, and this disclosure contemplates any suitable substrate made of any suitable material. In particular embodiments, mechanical stack 30A may include a conductive layer 34 positioned between a bottom surface of substrate 32 with electrodes 24 and a display 36 and PCB 38. As an example and not by way of limitation, conductive layer 34 may include a substrate with conductive material disposed on a surface of the substrate. As another example, the substrate on which conductive layer 34 is disposed may be a substantially transparent substrate. Furthermore, the conductive material of conductive layer 34 may be a mesh of conductive material, such as for example copper or aluminum, as described above. As another example, conductive layer 34 may be a layer of a transparent conductive material, such as for example ITO. In particular embodiments, conductive layer 34 may be separated from electrodes 24 by at least the thickness of substrate 32.

In particular embodiments, conductive layer 34 may effectively shield electrodes 24 from noise generated by display 36 and PCB 38, as described below. Although this disclosure describes a conductive layer fabricated with particular compositions of particular conductive materials, this disclosure contemplates any suitable conductive layer fabricated with any suitable composition of any suitable material. In particular embodiments, display 36 may include a display stack with its own structure and with one or more layers that have functions independent of the other layers of mechanical stack 30A, such as for example presenting an image to a user. In particular embodiments, capacitance $C_{self}$ is formed in part between an electrode 24 of the touch sensor and other conductive material of the touch sensor (not shown) that is capacitively or galvanically coupled to ground. Capacitance $C_{self}$ is the capacitance from an electrode to the "touching" object or the capacitance change being measured. Capacitance 40 represents capacitive coupling between the bottom layer of mechanical stack 30 and free space. In particular embodiments, signals from a controller (e.g. touch-sensor controller) or other suitable circuit on PCB 38 may control voltage source 52 coupled to conductive layer 34.

Figure 3B:
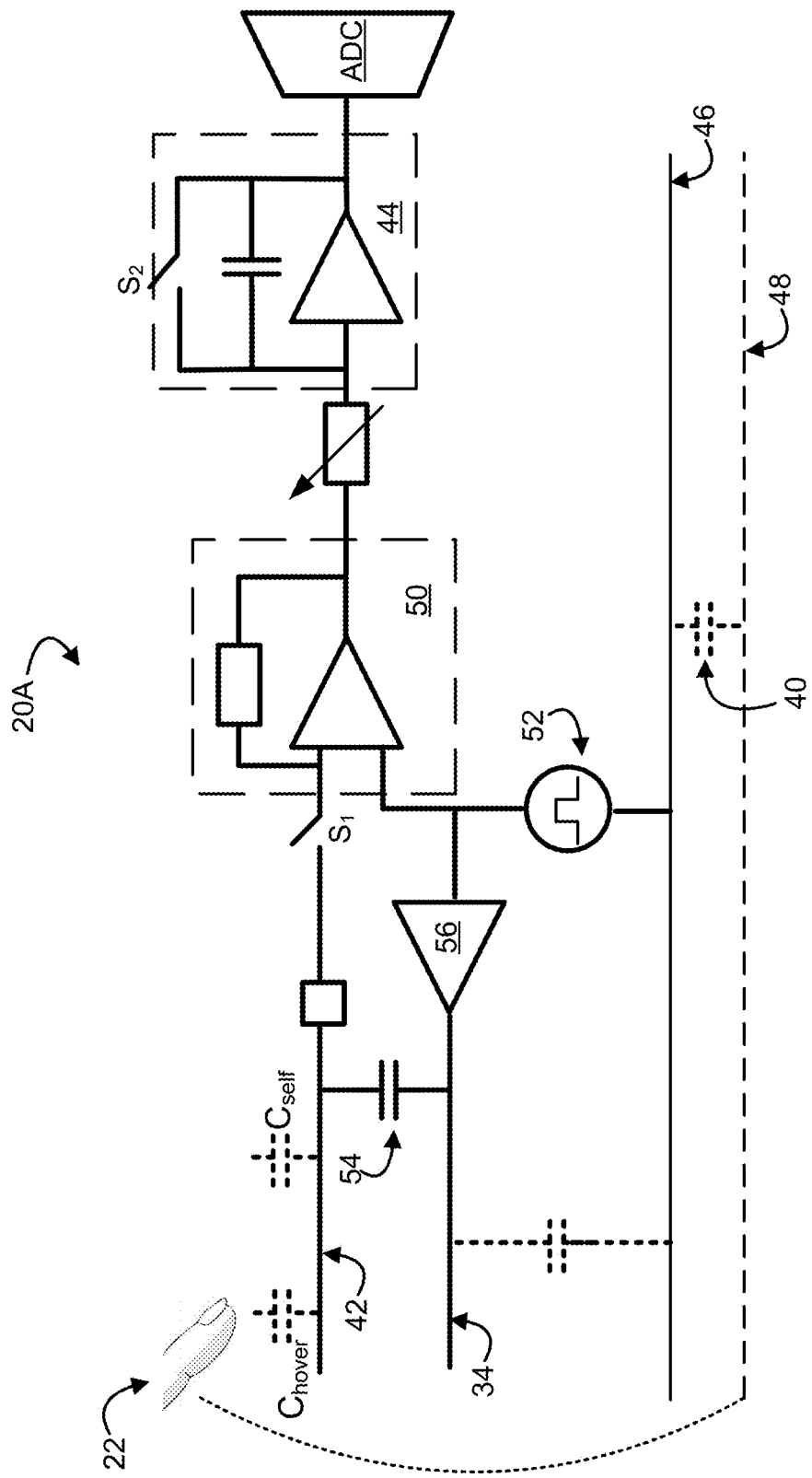
FIG. 3B illustrates an example circuit schematic for driven shield self-capacitance measurements.

FIG. 3B illustrates an example circuit schematic for driven shield self-capacitance measurements. Example driven shield self-capacitance measurement circuit 20A may determine a change of a touch sensor capacitance schematically illustrated in the example of FIGS. 3A-B by capacitance $C_{hover}$. As described above, the capacitance formed between an electrode of the touch sensor and other conductive material of the touch sensor that is capacitively or galvanically coupled to ground is part of a parasitic electrode capacitance $C_{self}$. As an example and not by way of limitation, the other conductive material of the touch sensor may include portions of tracks, pins, or internal network of the touch sensor. In the example of FIG. 3B, the capacitance of the electrodes, either drive or sense, is schematically illustrated by capacitor $C_{self}$. Furthermore, the total capacitance of the electrodes may be modified by the presence of an object schematically illustrated by capacitor $C_{hover}$. Capacitance $C_{self}$ and capacitor $C_{hover}$ associated with one or more electrodes are coupled to an associated sense line 42. Sense line 42 is coupled to conductive layer 34 through a capacitance 54. Local ground 46 of the mechanical stack is coupled to a ground of free space 48 through capacitance 40.

As illustrated in the example of FIG. 3B, capacitance $C_{hover}$ may be coupled to an integration circuit 44 through switch $S_1$ and amplifier circuit 50. Switch $S_1$ may function to couple one or more sense lines 42 to be measured depending on whether switch $S_1$ is opened or closed. In particular embodiments, integration circuit 44 may include an operational amplifier (op-amp) and an integration capacitor coupled to an input terminal and the output terminal of the op-amp. Furthermore, the output of integration circuit 44 may be transmitted for further processing by an analog-to-digital converter (ADC) or any suitable processing circuitry. In particular embodiments, amplifier circuit 50 may include an op-amp and with a resistor coupled to an input and the output of the op-amp. In particular embodiments, voltage source 52 may be coupled to conductive layer 34 through driver 56 and to a terminal of amplifier circuit 50. Although this disclosure describes and illustrates a particular arrangement of particular components for the measurement circuit, including the amplifier and integration circuits, this disclosure contemplates any suitable arrangement of any suitable components for the measurement circuit.

As illustrated in the example of FIG. 3A, conductive layer 34 may be located in the mechanical stack between the PCB, that may include measurement circuit 20, and the display. In particular embodiments, the "virtual ground" of the input to amplifier circuit 50 maintains a substantially constant voltage between sense line 42 and conductive layer 34, thereby negating any capacitive contribution through capacitance 54, as described below. In other words, a transfer of an amount of charge between object 22 and electrodes of sense line 42 may occur through $C_{hover}$, but the voltage between sense line 42 and conductive layer 34 remains substantially constant due to the virtual ground. The current introduced by the presence of object 22 may be amplified by amplifier circuit 50 and transmitted to integration circuit 44.

In particular embodiments, a pre-determined voltage from voltage source 52 may be substantially simultaneously applied to sense line 42 and conductive layer 34. As an example and not by way of limitation, the pre-determined voltage from voltage source 52 may be a square wave, sine wave, or any suitable voltage waveform. The voltage of sense line 42 and conductive layer 34 may be modulated in unison relative to ground 48 of free space in response to application of the pre-determined voltage, such that substantially no charge is transferred between sense line 42 and conductive layer 34 through capacitance 54. As an example and not by way of limitation, the pre-determined voltage may be applied to sense line 42 through an input of integrator circuit 44. In particular embodiments, the amount of voltage modulation relative to ground 48 of free space may be determined at least in part on a ratio of the capacitance 40 to free space compared to the total capacitance of the $C_{self}$ and capacitor $C_{hover}$ coupled to sense line 42. As an example and not by way of limitation, the voltage modulation on measurement circuit 20 relative to ground 48 of free space may increase in the presence of object 22 that increases the total capacitance of the sense line 42 by the capacitance of $C_{hover}$. As described above, moving object 22, such as example a finger or stylus, into proximity of the electrodes initiates a transfer of an amount of charge or current between object 22 and one or more electrodes through $C_{hover}$. Furthermore, the amount charge or current introduced by the presence of object 22 may be amplified by amplifier circuit 50 and the output of the amplifier circuit 50 may be transmitted to integration circuit 44.

Figure 4A:
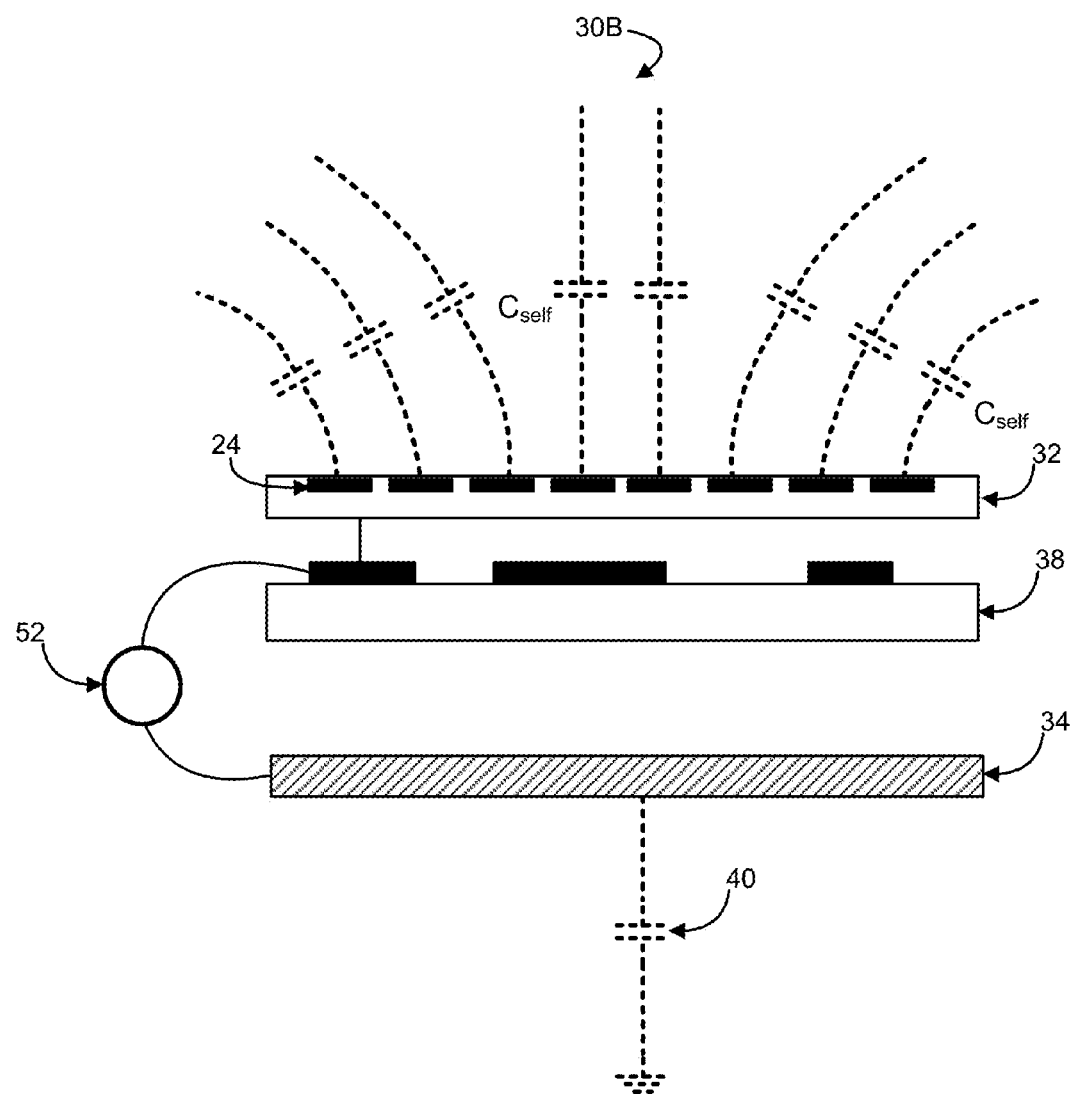
FIG. 4A-B illustrate examples of mechanical stacks for driven plate self-capacitance measurements.
Figure 4B:
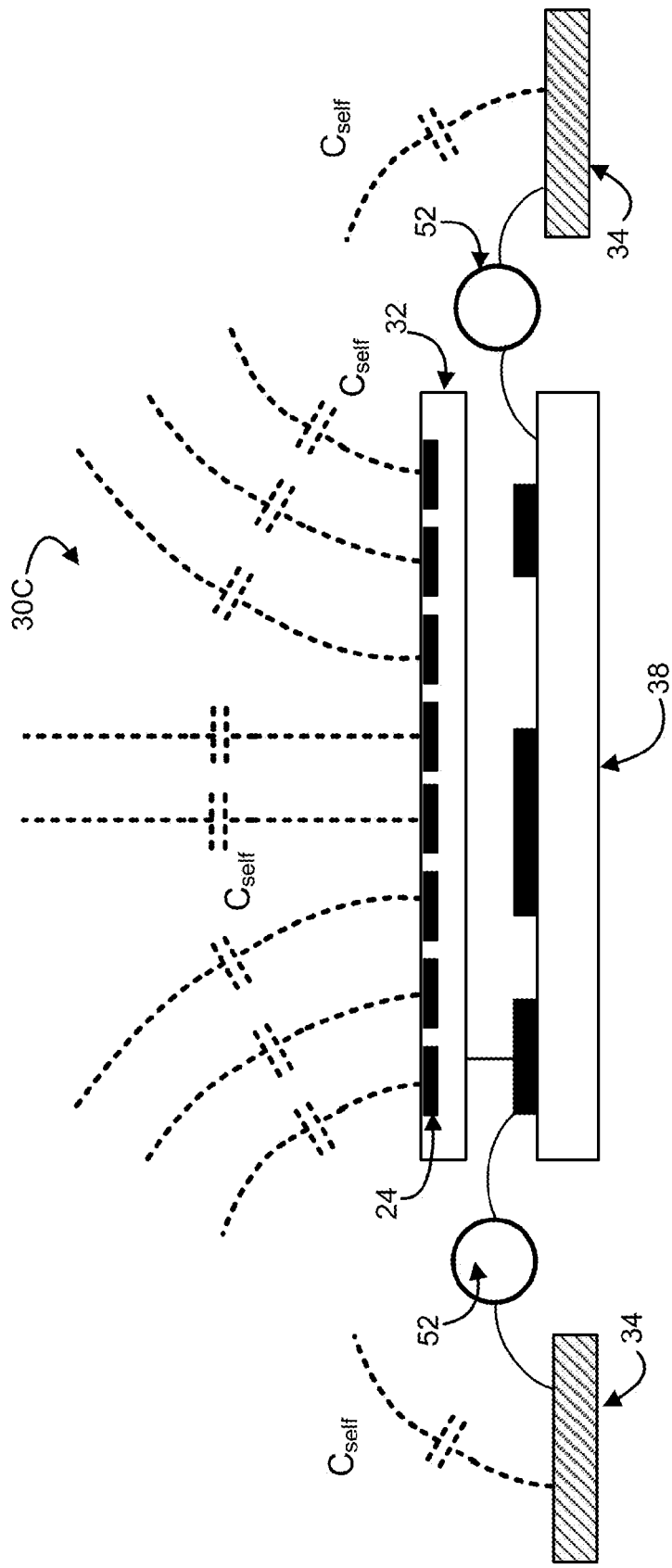

FIGS. 4A-B illustrate example mechanical stacks for driven plate self-capacitance measurements. In particular embodiments, mechanical stacks 30B-C may include a substrate 32 with conductive material forming the drive and sense electrodes 24 of the touch sensor, as illustrated in the example of FIG. 1. In particular embodiments, mechanical stack 30B may include a conductive layer 34 positioned underneath PCB 38, such that conductive layer 34 may be separated from electrodes 24 by at least the thickness of substrate 32, as illustrated in the example of FIG. 4A. As an example and not by way of limitation, conductive layer 34 may be positioned at a bottom of a device housing mechanical stack 30B. In particular embodiments, mechanical stack 30C may include an annular-shaped conductive layer 34 that surrounds PCB 38, as illustrated in the example of FIG. 4B. As an example and not by way of limitation, conductive layer 34 may be positioned within a device housing, such that conductive layer 34 surrounds PCB 38. Furthermore, conductive layer 34 may be a substrate of conductive material or a substrate with conductive material coating a surface of the substrate. Furthermore, the conductive material of conductive layer 34 may be a metal, such as for example copper or aluminum. Although this disclosure describes a conductive layer fabricated with particular compositions of particular conductive materials having a particular configuration and shape, this disclosure contemplates any suitable conductive layer fabricated with any suitable composition of any suitable material having any suitable configuration or shape. As described above, capacitance $C_{hover}$ is the capacitance from an electrode to the "touching" object or the capacitance change being measured. Capacitance 40 represents capacitive coupling between conductive layer 34 and free space. The touch-sensor controller may be located on PCB 38 and signals from the touch-sensor controller may control voltage source 52 coupled to conductive layer 34, as well as signals for operating the touch sensor that includes electrodes 24. Capacitance 40 represents capacitive coupling between conductive layer 34 and free space.

Figure 5:
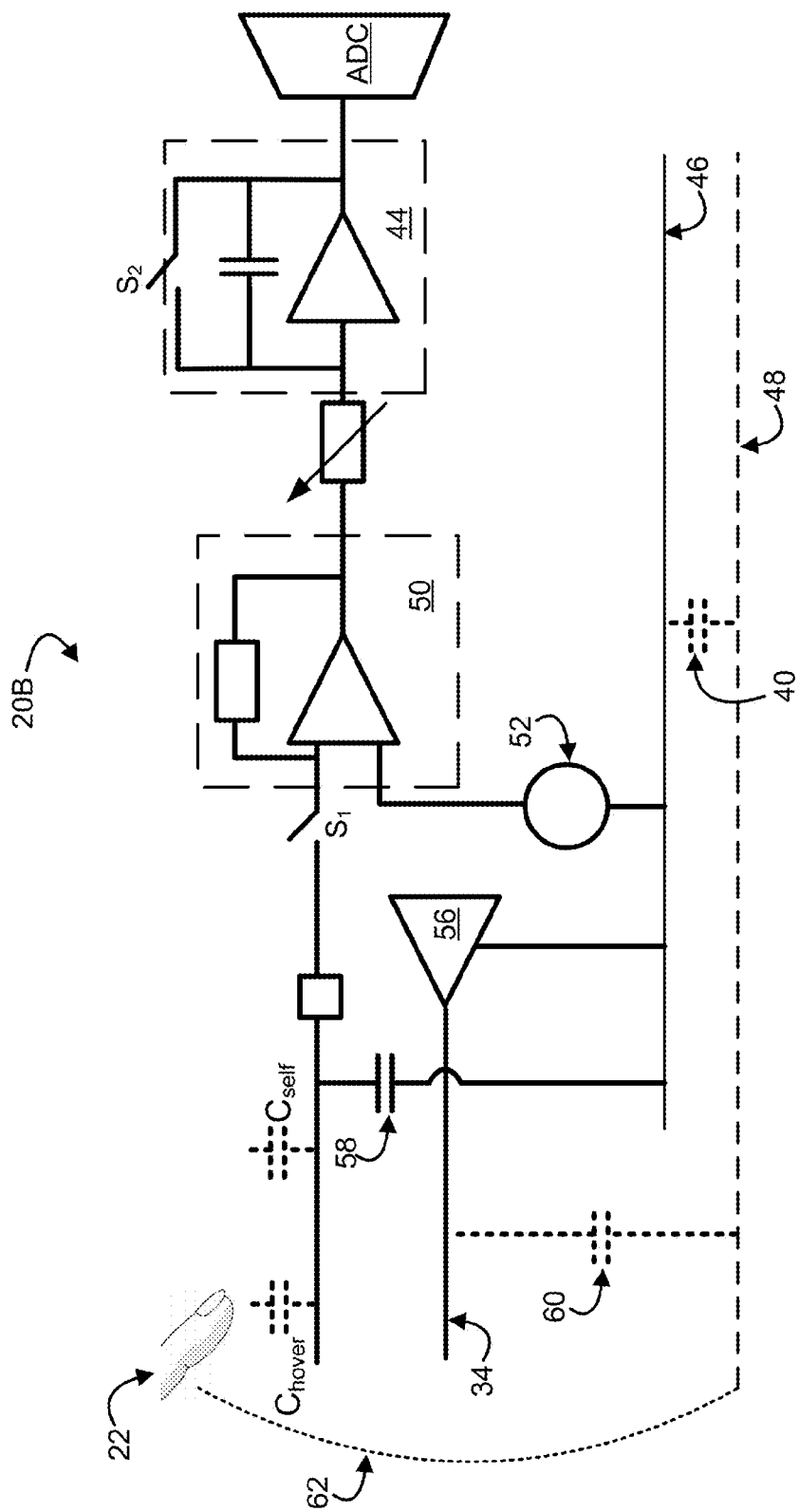
FIG. 5 illustrates an example circuit schematic for driven plate self-capacitance measurements.

FIG. 5 illustrates an example circuit schematic for driven plate self-capacitance measurements. Example driven plate self-capacitance measurement circuit 20B may determine a change of a touch sensor capacitance schematically illustrated in the example of FIGS. 4A-B by capacitance $C_{hover}$. As described above, the capacitance formed between an electrode of the touch sensor and other conductive material of the touch sensor that is capacitively or galvanically coupled to ground is part of electrode capacitance $C_{self}$. In the example of FIG. 5, the capacitance of the electrodes, either drive or sense, is schematically illustrated by capacitors $C_{self}$. Furthermore, the total capacitance of the electrodes may be modified by the presence of an object schematically illustrated by capacitor $C_{hover}$. Capacitance $C_{self}$ and capacitor $C_{hover}$ associated with one or more electrodes are coupled to an associated sense line 42. Local ground 46 of the mechanical stack is coupled to a ground of free space 48 through capacitance 40.

As illustrated in the example of FIG. 5, capacitance $C_{hover}$ may be coupled to an integration circuit 44 through switch 51 and amplifier circuit 50. As described above, integration circuit 44 may include an operational amplifier (op-amp) and an integration capacitor coupled to an input terminal and the output terminal of the op-amp. Furthermore, the output of integration circuit 44 may be transmitted for further processing by an analog-to-digital converter (ADC) or any suitable processing circuitry. In particular embodiments, amplifier circuit 50 may include an op-amp and with a resistor coupled to an input and the output of the op-amp. Sense line 42 is coupled to local ground 46 of the mechanical stack through a capacitance 58 and conductive layer 34 is coupled to ground of free space 48 through capacitance 60. In particular embodiments, local ground 46 may be coupled to conductive layer 34 through driver 56. Although this disclosure describes and illustrates a particular arrangement of particular components for the measurement circuit, including the amplifier and integration circuits, this disclosure contemplates any suitable arrangement of any suitable components for the measurement circuit.

As described above, conductive layer 34 may be located substantially at the bottom of a device that includes the mechanical stack and circuit 20B. In particular embodiments, when the device housing the mechanical stack is floating, such as for example when the device is placed on a non-conductive surface, conductive layer 34 is capacitively coupled to the electrodes through capacitance $C_{hover}$ and coupling of the body of the user to ground 48 of free space, schematically illustrated in the example of FIG. 5 by 62. In particular embodiments, when the device housing the mechanical stack is held by the user, conductive layer 34 is capacitively coupled to the hand holding the device through capacitance 60. As described above, the electrodes are in turn capacitively coupled to the hand holding the device through capacitor $C_{hover}$ and the body of the user. In particular embodiments, applying a pre-determined voltage to sense line 42 and conductive layer 34 through voltage source 52 causes the voltage of conductive layer 34 and sense line 42 to move in unison relative to ground of free space 48 through charge being transferred in to and out from the electrodes through capacitances 40 and 60. As an example and not by way of limitation, the pre-determined voltage from voltage source 52 may be a square wave, sine wave, or any suitable voltage waveform.

As described above, object 22, such as example a finger or stylus, in proximity to the electrodes initiates a transfer of an amount of charge between object 22 and one or more electrodes through capacitances $C_{hover}$ and capacitance 60. Object 22 is capacitively coupled to ground 48 of free space, schematically illustrated by 62, and when object 22 is moved in proximity to the electrodes the capacitive coupling, described above, is distorted. The distortion of the capacitive coupling in turn modulates the charge transfer or current between conductive layer 34 and the electrodes. Furthermore, the amount of charge of current introduced by the presence of object 22 may be amplified by amplifier circuit 50 and the output of the amplifier circuit 50 may be transmitted to integration circuit 44. In particular embodiments, the amount of voltage modulation relative to ground 48 of free space may be determined at least in part on a ratio of the capacitance 40 to free space compared to the total capacitance of the $C_{self}$ and capacitor $C_{hover}$ coupled to sense line 42. As an example and not by way of limitation, the voltage modulation on measurement circuit 20 may increase in the presence of object 22 that increases the capacitance of $C_{hover}$.

Figure 6:
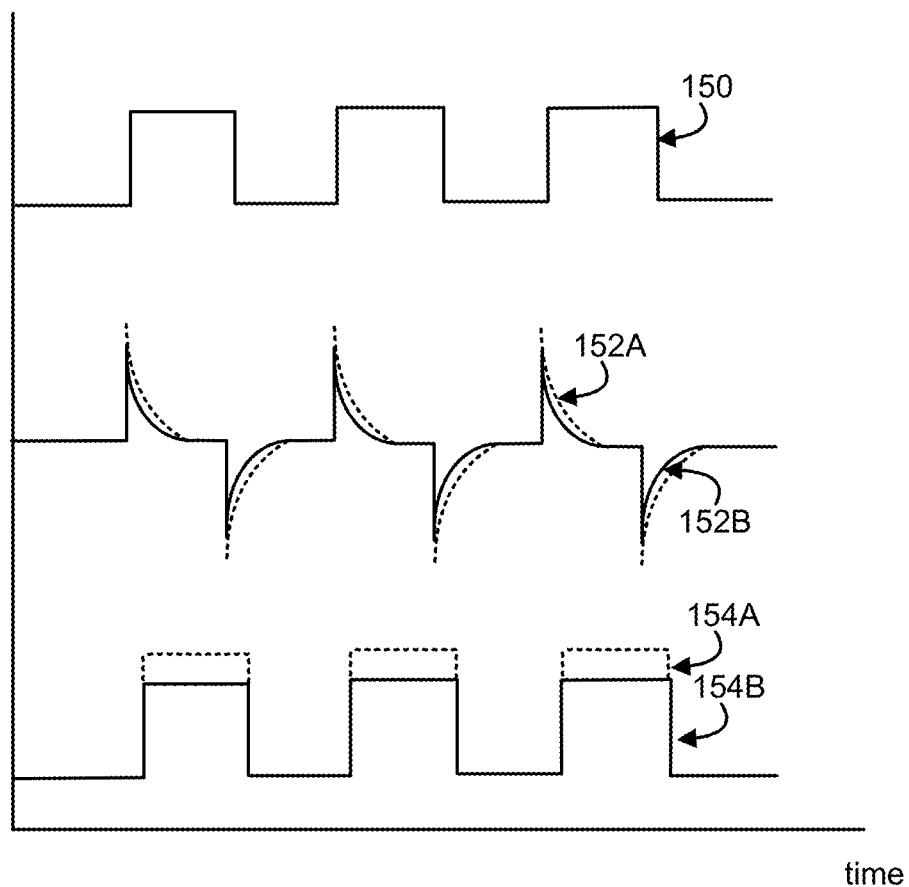
FIG. 6 illustrates example waveforms for example common-mode self-capacitance measurements.

FIG. 6 illustrates example waveforms of an example common-mode self-capacitance measurement. As described above, a conductive layer of a mechanical stack, illustrated in examples of FIGS. 3A and 4A-B, and one or more electrodes of a touch sensor may be substantially simultaneously biased with a pre-determined voltage 150. As an example and not by way of limitation, pre-determined voltage 150 may be a sinusoidal voltage waveform as function of time. As described above, charge is transferred to and from one or more electrodes in the through capacitive coupling with free space. A particular amount of current 152A is transferred to one or more electrodes in the absence of a proximity input through capacitive coupling of free space to the electrodes. As described above, the presence of a proximity input may decrease the amount of charge or current 152B transferred to and from the electrodes due at least in part to the increase in capacitive coupling free space from capacitance $C_{hover}$. As described above, the integration circuit integrates the current 152A-B of the electrodes to derive an output voltage 154A-B that may be used to determine whether a touch or proximity has occurred. As an example and not by way of limitation, output voltage 154A of the integration circuit may result a current from the electrodes in the absence of a touch input. In particular embodiments, output voltage 154A in the absence of a touch input may be used as a reference value. As another example, output voltage 154A of the integration circuit may result a current from the electrodes in the absence of a touch input. In particular embodiments, determination of whether a touch or proximity has occurred may be based at least in part on a difference of output voltage 154B with a touch input relative to output voltage 154A without a touch input. Although this disclosure describes and illustrates particular voltage levels in response to detection of a proximity input relative to a reference level, this disclosure contemplates any suitable voltage levels in response to detection of a proximity input relative to any suitable reference level.

Figure 7:
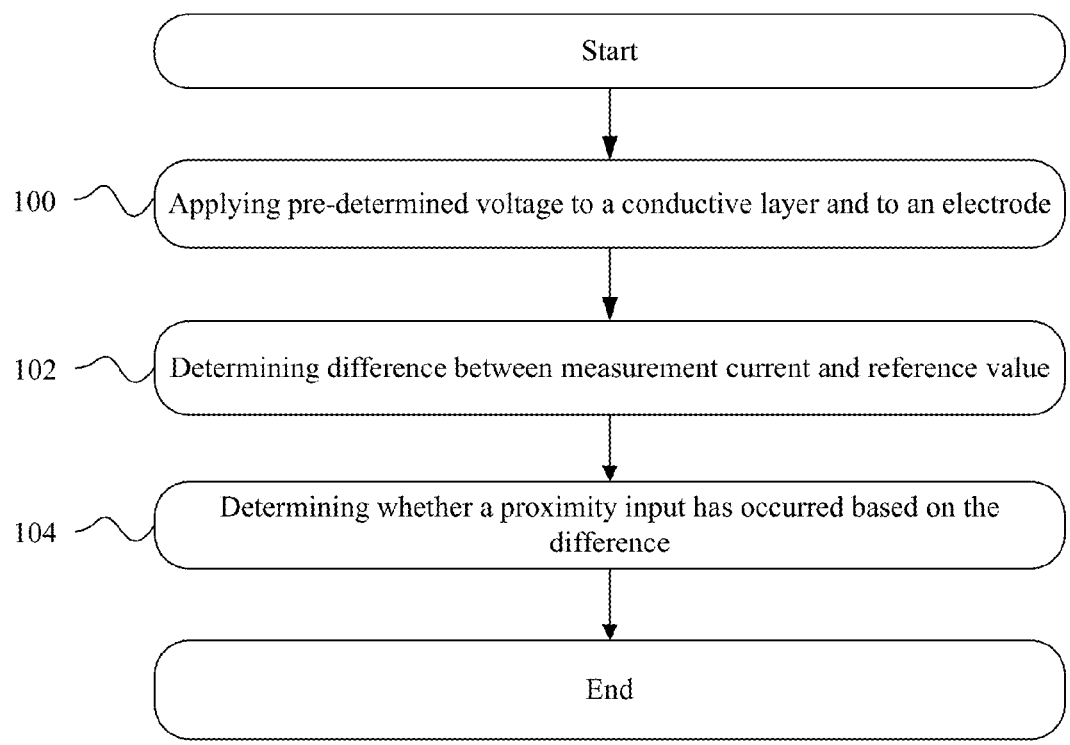
FIG. 7 illustrates an example method for common-mode self-capacitance measurements.

FIG. 7 illustrates an example method for common-mode self-capacitance measurements. The method may start at step 100, where a pre-determined voltage is substantially simultaneously applied to a conductive layer and to one or more electrodes of a touch sensor. As an example and not by way of limitation, the pre-determined voltage may be a square-wave. In particular embodiments, the conductive layer is spatially separated from the electrodes by at least a thickness of a substrate. In particular embodiments, the application of the pre-determined voltage initiates a measurement current at a capacitance that includes at least in part one or more of the electrodes. Step 102 determines a difference between the measurement current of the electrodes and a reference value. In particular embodiments, the reference value may correspond to a value of a current of the electrodes in response to the pre-determined voltage and in the absence of a touch or proximity input. At step 104, whether a proximity input to the touch sensor has occurred is determined based at least in part on the difference, at which point the method may end. Although this disclosure describes and illustrates particular steps of the method of FIG. 7 as occurring in a particular order, this disclosure contemplates any suitable steps of the method of FIG. 7 occurring in any suitable order. Particular embodiments may repeat one or more steps of the method of FIG. 7, where appropriate. Moreover, although this disclosure describes and illustrates an example method for common-mode self-capacitance measurements including the particular steps of the method of FIG. 7, this disclosure contemplates any suitable method for voltage driven self-capacitance measurements including any suitable steps, which may include all, some, or none of the steps of the method of FIG. 7, where appropriate. Moreover, although this disclosure describes and illustrates particular components carrying out particular steps of the method of FIG. 7, this disclosure contemplates any suitable combination of any suitable components carrying out any suitable steps of the method of FIG. 7.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   substantially simultaneously applying a pre-determined voltage to a conductive layer and to one or more electrodes of a touch sensor, the conductive layer disposed around at least two sides of a printed-circuit board (PCB), the one or more electrodes situated in a first plane, the conductive layer and the PCB situated in a second plane different than the first plane;
   determining a difference between a measurement current of one or more of the electrodes and a reference value; and
   determining whether a proximity or touch input to the touch sensor has occurred based at least in part on the difference.

2. The method of claim 1, wherein the determination of the difference comprises integrating the measurement current of one or more of the electrodes.

3. The method of claim 1, wherein the pre-determined voltage comprises a voltage having a square-wave waveform.

4. The method of claim 1, further comprising amplifying the measurement current.

5. The method of claim 1, wherein the application of the pre-determined voltage comprises applying the pre-determined voltage to an input of an integrator circuit.

6. The method of claim 1, wherein the conductive layer is annular shaped and surrounds the PCB.

7. The method of claim 6, wherein a device housing the PCB is held by a user.

8. A computer-readable non-transitory storage medium embodying instructions configured, when executed, to:
   substantially simultaneously apply a pre-determined voltage to a conductive layer and to one or more electrodes of a touch sensor, the conductive layer disposed around at least two sides of a printed-circuit board (PCB), the one or more electrodes situated in a first plane, the conductive layer and the PCB situated in a second plane different than the first plane;
   determine a difference between a measurement current of one or more of the electrodes and a reference value; and
   determine whether a proximity or touch input to the touch sensor has occurred based at least in part on the difference.

9. The medium of claim 8, wherein the instructions are further configured to integrate the measurement current of one or more of the electrodes.

10. The medium of claim 8, wherein the pre-determined voltage comprises a voltage having a square-wave waveform.

11. The medium of claim 8, wherein the instructions are further configured to amplify the measurement current.

12. The medium of claim 8, wherein the instructions are further configured to apply the pre-determined voltage to an input of an integrator circuit.

13. The medium of claim 8, wherein the conductive layer is annular shaped and surrounds the PCB.

14. The medium of claim 13, wherein a device housing the PCB is held by a user.

15. A device comprising:
   a measurement circuit;
   a touch sensor; and
   a computer-readable non-transitory storage medium coupled to the measurement circuit and embodying instructions configured, when executed, to:
   substantially simultaneously apply a pre-determined voltage to a conductive layer and to one or more electrodes of the touch sensor, the conductive layer disposed around at least two sides of a printed-circuit board (PCB), the one or more electrodes situated in a first plane, the conductive layer and the PCB situated in a second plane different than the first plane;
   determine a difference between a measurement current of one or more of the electrodes and a reference value; and
   determine whether a proximity or touch input to the touch sensor has occurred based at least in part on the difference.

16. The device of claim 15, wherein the pre-determined voltage comprises a voltage having a square-wave waveform.

17. The device of claim 15, wherein the instructions are further configured to apply the pre-determined voltage to an input of an integrator circuit.

* * * * *